Patented Dec. 22, 1953

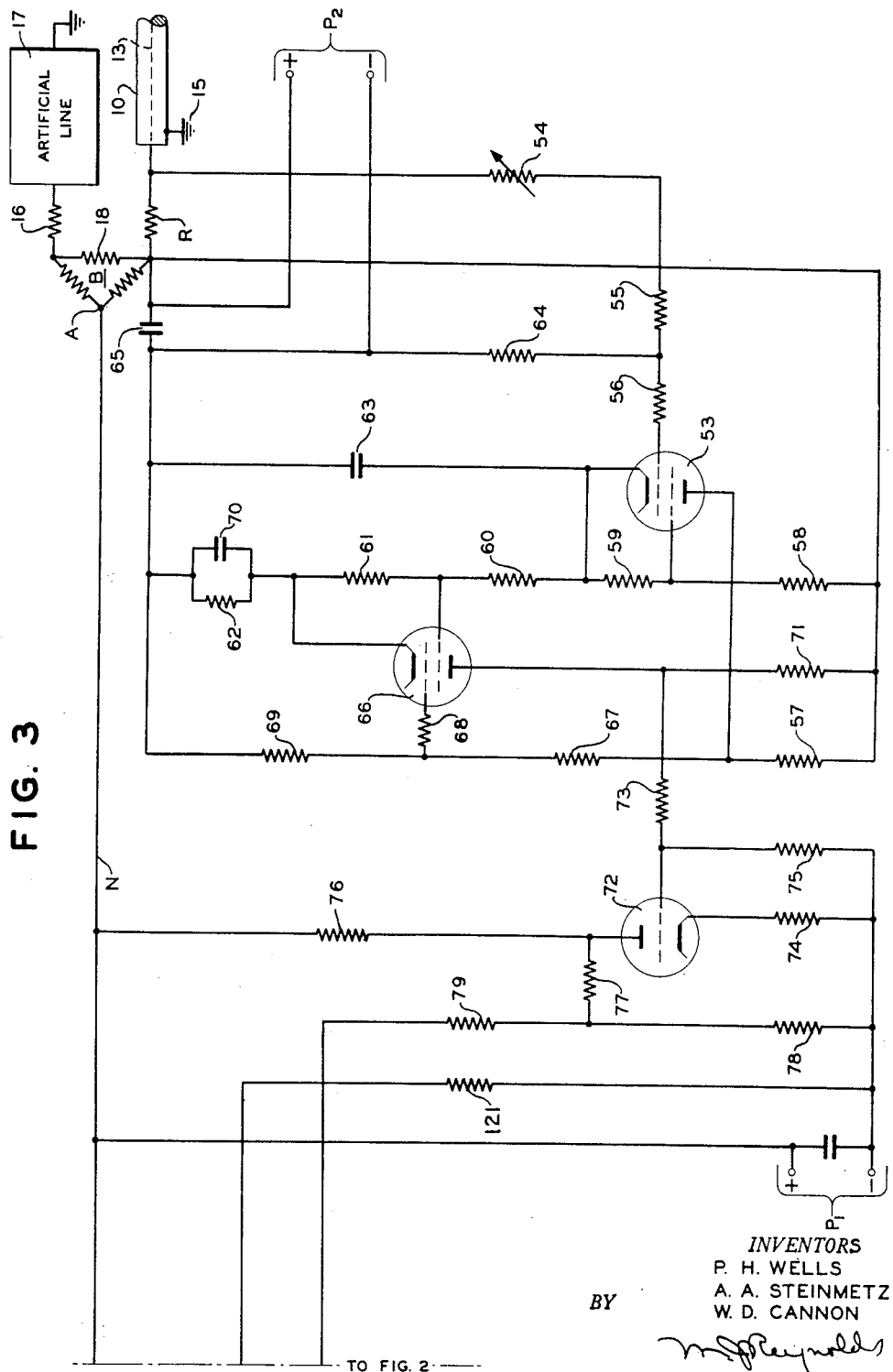

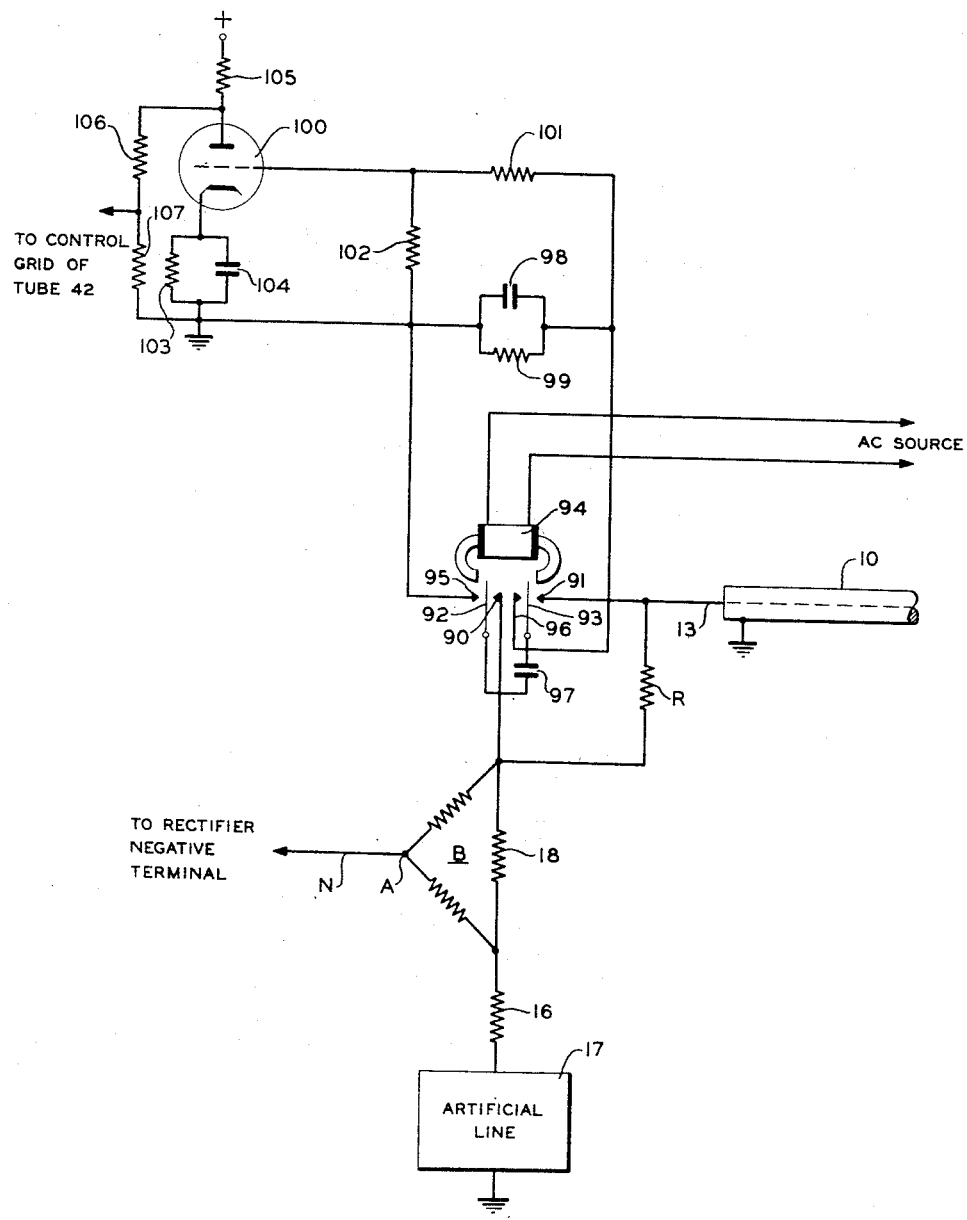

2,663,759

UNITED STATES PATENT OFFICE 2,663,759

REGULATED POWER SUPPLY

Philip H. Wells, Chatham, N. J., Alfred A. Steinmetz, Yonkers, N. Y., and William D. Cannon, Metuchen, N. J., assignors to The Western Union Telegraph Company, New York, N. Y., a corporation of New York Application May 31, 1951, Serial No. 229,194

16 Claims. (Cl. 178—70)

1

The present invention relates to shore station apparatus for submarine cables having submerged electronic repeaters incorporated therein, and more particularly to regulated power supplies for operating submerged repeaters.

As indicated in the copending application of H. F. Wilder, Serial No. 229,146, filed May 31, 1951, addition of a repeating amplifier in a submerged portion of a submarine cable circuit provides a number of advantages, such as a large increase in the permissible speed of telegraphic communication over the cable.

A submerged submarine cable repeater requires for its various circuits a direct current which is supplied to it over a cable conductor from the nearer shore station and which returns through earth. A typical submerged repeater might require, for example, a direct current in the order of 0.32 ampere at a voltage of 125 volts. Under normal conditions, an equal additional current is drawn by the terminal artificial line. In the example assumed, the shore station power supply might have to provide a current of 0.64 ampere at an operating potential of 400 volts, 275 volts being dissipated in cable circuit resistance and 0.32 ampere flowing through the artificial line.

For continuous stable operation, the direct current supplied to the repeater should be kept substantially constant, preferably within ±0.5%. The power supply should be able to supply this substantially constant current despite large variations in commercial alternating current potential and potential differences between the sea earth and the shore-end earth as high as 300 volts. This latter potential, which may be in either aiding or opposing polarity, is termed an earth potential. With an aiding earth potential of 300 volts in the example assumed above, the supply voltage would have to reduce to approximately 60 volts and deliver a current of about 0.4 ampere in order to maintain the repeater current constant. With an opposing earth potential of 300 volts, the supply voltage must increase to approximately 740 volts and deliver a current of about 0.92 ampere.

In order to reduce electrolytic erosion of the submerged repeater casing, the shore station power supply should be operated with a positive ground connection, applying the negative potential to the cable conductor. It is also desirable that a single cable conductor be used for both repeater operating current and signaling current, as the cost of providing an additional conductor in the same cable or a separate cable is very high.

2

Accordingly, it is an object of the invention to provide a regulated power supply circuit for a submarine cable submerged repeater.

More particularly, it is an object of the invention to provide a power supply for a submarine cable submerged repeater having a substantially constant current despite variations in input alternating potential and varying earth potentials.

Another object of the invention is to provide a regulated power supply for a submarine cable submerged repeater having a grounded positive connection.

Further objects of the invention will appear from the following description.

In accordance with the invention, these objects are achieved by providing a series connected current stabilizer having an impedance value controlled as a function of the output current and voltage and a direct voltage supply having an output controlled as a function of the impedance value of the current stabilizer.

The invention will now be described in greater detail with reference to the appended drawings in which:

Figs. 2 and 3 show in greater detail the arrangement of Fig. 1; and

Fig. 4 illustrates a modification of a portion of the arrangement of Figs. 2 and 3.

Figure 1:
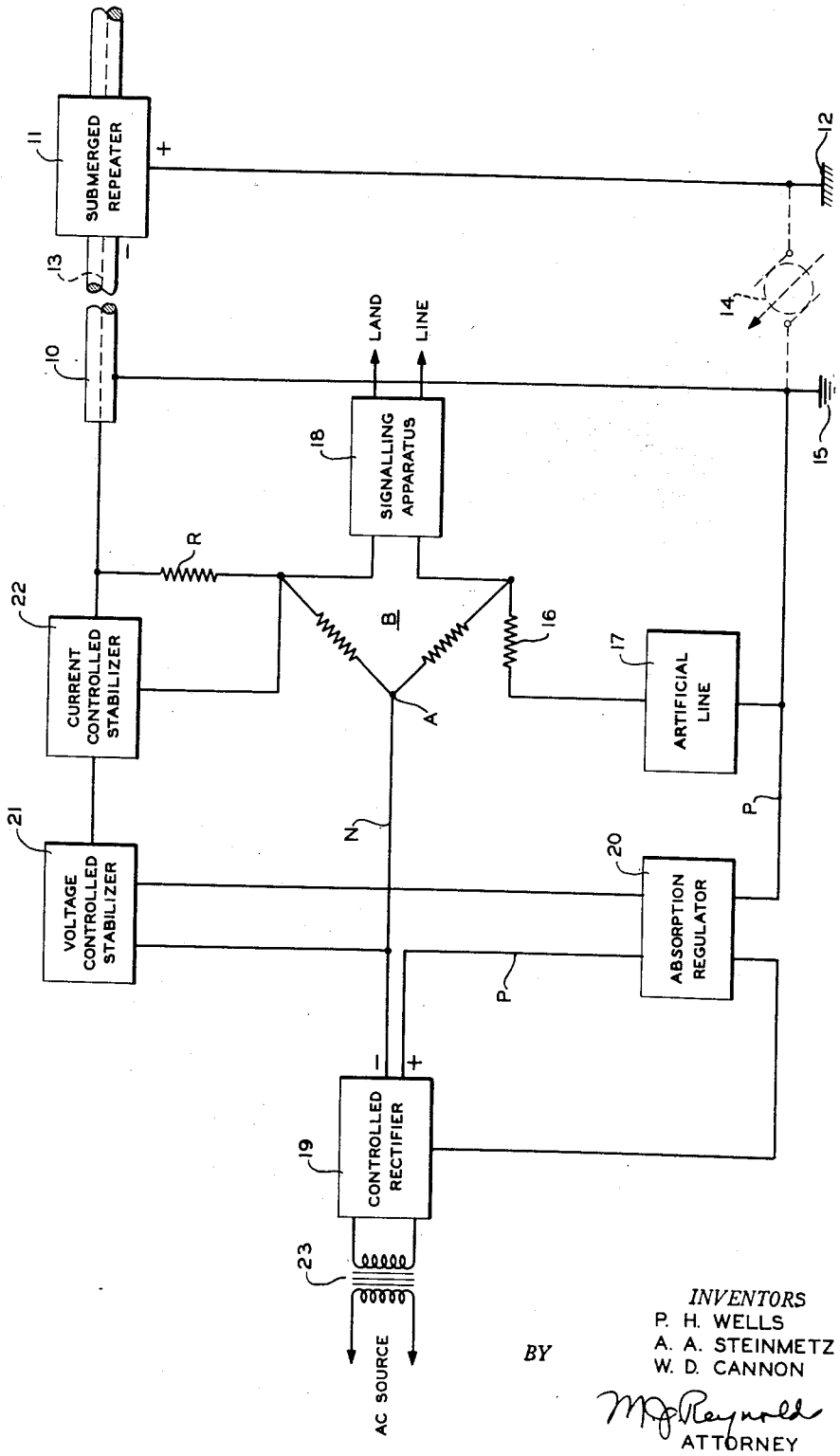
Fig. 1 is a block diagram illustrating a controlled power supply in accordance with the invention.

Referring now to the drawing and more particularly to Fig. 1, there is shown one end of a submarine cable 10 having a submerged repeater 11 incorporated therein. The positive terminal of repeater 11 is connected to sea earth 12, while the negative terminal thereof is connected to a cable conductor 13 interconnecting repeater 11 and the shore station. A variable voltage generator 14 is shown interconnecting sea earth 12 and the shore station ground 15. Generator 14 represents the earth potential which may be poled in either direction and which may have a magnitude varying between 0 and 300 volts or more.

The shore station illustrated is preferably the receiving terminal for the cable, but may also be the sending terminal. Conductor 13 is coupled, at the shore station, to one terminal of the cable bridge B through a resistor R. The opposite terminal of bridge B is coupled to ground through a resistor 16 and an artificial line 17. These terminals of bridge B are connected to the shore station signaling apparatus 18. Apparatus 18 is, in turn, connected to a land line. Apex A of bridge B is connected to the negative terminal of a controlled rectifier circuit 19 through a negative bus N. The positive terminal of rectifier 19 is coupled to ground through positive bus P. Positive bus P has a variable impedance absorption regulator 20 interposed therein.

The output voltage of rectifier 19 is controlled, in a manner to be set forth more fully hereinafter, as a function of the impedance of absorption regulator 20. The impedance of absorption regulator 20 is controlled as a function of the voltage between bus N and ground by a voltage controlled stabilizer circuit 21 and as a function of the current flowing through resistor R by a current controlled stabilizer circuit 22.

The circuits and operation of rectifier 19, regulator 20 and stabilizers 21 and 22 will be explained more fully hereinafter in connection with Fig. 2.

Rectifier 19 is supplied with power from an A. C. source through a transformer 23.

As indicated hereinbefore, the shore station power supply must furnish to repeater 11 over cable conductor 13 a direct current having a predetermined value substantially independent of variations in magnitude and polarity of earth potential and variations in magnitude of the commercial voltage source. Absorption regulator 20 provides a variable impedance in series with positive bus P. The value of this impedance is varied by voltage controlled stabilizer 21 in a sense to oppose changes in voltage of bus N with respect to ground. The value of the impedance is also varied by current controlled stabilizer 22 in a sense to oppose any change in current through resistor R.

It is evident that with a high value of aiding earth potential, the current through regulator 20 will be relatively small. On the other hand, with a high value of opposing earth potential, the current through regulator 20 will be relatively large. To reduce the wide range of current values through regulator 20, the output voltage of rectifier 19 is controlled as a function of the voltage drop across regulator 20 in a sense to aid the maintenance of constant current through resistor R.

The power supply will now be described in greater detail with reference to Figs. 2 and 3 wherein reference characters identical with those in Fig. 1 denote like elements.

Figure 2:
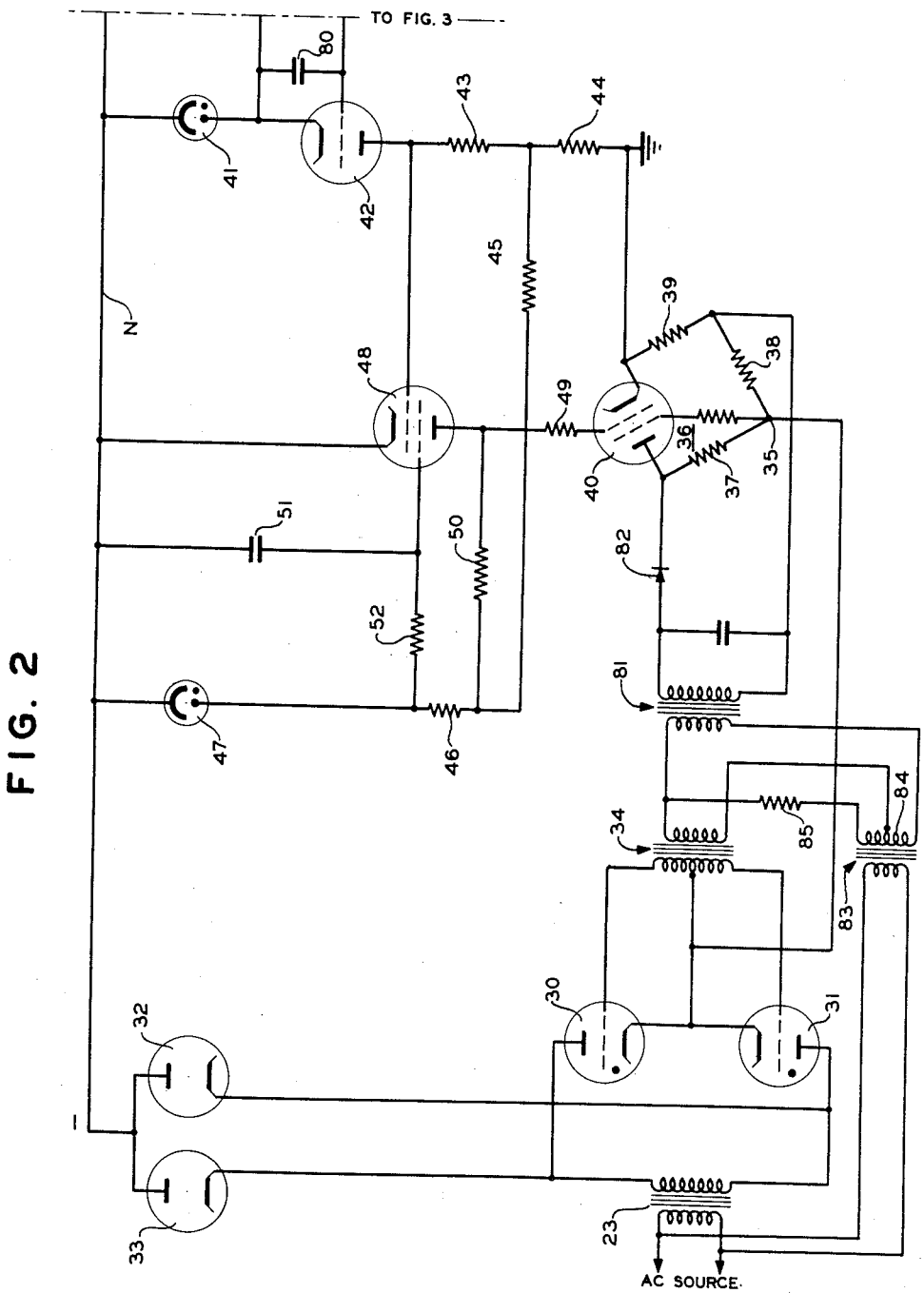

In Fig. 2, the source of direct voltage for the repeater comprises a full-wave grid-controlled thyratron rectifier circuit including thyratrons 30 and 31. The anodes of thyratrons 30 and 31 are connected to respective ends of the secondary winding of power transformer 23 and to the respective cathodes of diodes 32 and 33. The anodes of diodes 32 and 33 are connected to negative bus N. The cathodes of thyratrons 30 and 31 are connected to the center tap of the secondary winding of a grid control transformer 34 and to a terminal 35 of a bridge circuit 36. The grids of thyratrons 30 and 31 are connected to respective ends of the secondary winding of transformer 34. The grid control of thyratrons 30 and 31 will be described more fully hereinafter.

The four arms of bridge circuit 36 comprise, respectively, resistors 37, 38 and 39, and the anode-cathode discharge path of a tetrode 40. The junction of resistor 39 and the cathode of tube 40 is connected to ground. As it is evident that the bridge circuit will have to carry a relatively large current, tube 40 may be replaced by a plurality of parallel connected tubes. In a typical embodiment of the invention, resistors 37, 38 and 39 were given values of 40, 40 and 1000 ohms, respectively, while tube 40 was replaced by eight parallel connected 807 type tubes. The values of circuit parameters and the tube types given above and to be mentioned hereinafter are given for purposes of illustration only and are not to be considered as limiting. The operation of bridge circuit 36 will be described more fully hereinafter.

Negative bus N is connected to apex A of cable bridge B. Between bus N and ground is connected a series circuit comprising a voltage regulator tube 41, the cathode-anode path of an electron discharge tube 42, resistor 43 and resistor 44. The cathode of voltage regulator tube 41 is coupled to the negative terminal of a source P1 of substantially constant direct potential through resistor 121. The positive terminal of source P1 is connected to bus N. Tube 41 establishes a reference level at the cathode of tube 42. The junction of resistors 43 and 44 is coupled to negative bus N through series connected resistors 45 and 46 and a voltage regulator tube 47. This latter series circuit, together with resistor 44, constitutes a voltage divider circuit applying variations in potential of bus N to the anode of tube 42. The anode-cathode potential of tube 42 is also varied directly with changes in potential of bus N which are applied to the cathode thereof through voltage regulator tube 41.

The cathode of a tetrode 48 is connected to bus N. The anode of tetrode 48 is coupled to the control grid of tube 40 through a resistor 49 and to the positive ground through a resistor 50 and resistors 45 and 44. The screen grid of tube 48 is coupled to bus N through a capacitor 51 and to the junction of voltage regulator tube 47 and resistor 46 through a resistor 52. The control grid of tube 48 is connected to the anode of tube 42.

Any tendency for the potential of bus N to increase, i. e., become more negative, will result in a greater voltage drop across tube 42, making the anode potential thereof more positive and reducing the negative bias on the grid of tube 48. A reduction in grid bias of tube 48 will increase the anode current flow thereof, thereby increasing the voltage drop across resistor 49 and increasing the negative bias on the control grid of tube 40. An increased control grid bias on tube 40 increases the impedance thereof, thereby tending to reduce the voltage of bus N to its former value. If the potential of bus N had tended to decrease, i. e., become less negative, the impedance of tube 40 would have been decreased, resulting in an increase in potential of bus N to its former value. The effect of variations in impedance of tube 40 on the rectified output voltage will be described more fully hereinafter.

A resistor R, in series with the cable circuit, is used to provide a voltage proportional to the cable current. The voltage developed across resistor R is applied to the control grid of an amplifier tube 53 through a variable resistor 54 and resistors 55 and 56. The end of resistor R remote from the control grid of tube 53 is connected to the positive terminal of a source of potential P2, which positive terminal is also coupled to the anode of tube 53 through a resistor 57 and to one end of a voltage divider network comprising series connected resistors 58, 59, 60, 61 and 62. The cathode of tube 53 is connected to the junction of resistors 59 and 60 and is coupled to the negative terminal of source P2 through a capacitor 63. The junction of resistors 55 and 56 is coupled to the negative terminal of source P2 through a resistor 64. The screen grid of tube 53 is connected to the junction of resistors 58 and 59, thereby maintaining the screen grid at a suitable positive potential with respect to the cathode of tube 53. Alternating currents are shunted around source P2 by a capacitor 65.

The anode of tube 53 is coupled to the control grid of another amplifying tube 66 through series connected resistors 67 and 68. The control grid of tube 66 is coupled to the negative terminal of source P2 through resistor 68 and a resistor 69. The cathode of tube 66 is provided with a suitable biasing potential through resistor 62 suitably bypassed by a capacitor 70. The screen grid of tube 66 is provided with a positive operating potential by connection thereof to the junction of resistors 60 and 61. The anode of tube 66 is coupled to the positive terminal of source P2 through a resistor 71.

The anode of tube 66 is also coupled to the control grid of phase inverting tube 72 through a resistor 73. The cathode of tube 72 is coupled to the negative terminal of source P1 through a resistor 74, while the control grid thereof is coupled to the negative terminal of source P1 through a resistor 75. The anode of tube 72 is coupled to negative bus N through a resistor 76, the cathode thereof being placed at a suitable negative potential with respect to the anode by source P1. The anode of tube 72 is also coupled to the negative terminal of source P1 through a voltage divider network comprising resistors 77 and 78. The junction of resistors 77 and 78 is coupled to the control grid of tube 42 through a resistor 79. The control grid of tube 42 is by-passed with respect to alternating current by a capacitor 80 intercoupling the control grid and cathode electrodes of tube 42.

It will be noted that tubes 53, 66 and 72 are connected in D. C. amplifier arrangement so that the direct voltage across resistor R produces a voltage at the control grid of tube 42. An increase of direct current in the cable circuit will increase the voltage drop across resistor R, decreasing the bias of tube 53 and consequently lowering the anode potential thereof. The lowered anode potential of tube 53 produces an increased bias for tube 66, thereby increasing the anode potential thereof.

The increased anode potential of tube 66 is applied to the control grid of tube 72 which is operated as a phase inverter with less than unity gain to offset the effects of potential swings across the cable-apex arm of bridge B. The increased potential applied to the grid of tube 72 lowers the anode potential thereof, thereby raising the bias on the control grid of tube 42 and increasing the effective impedance of tube 42. As a result, the anode potential of tube 42 will rise, decreasing the bias on the control grid of tube 48 thereby decreasing the anode potential of tube 48. The decrease in anode potential of tube 48 appears as an increase in negative bias on the control grid of tube 40, increasing the impedance of tube 40 thereby lowering the current in the cable circuit to its prior value. A decrease in cable current below the predetermined desired value thereof would result in a decrease of impedance of tube 40 with a consequent increase in cable current.

It will be noted that the impedance of tube 40 is varied in accordance with changes in potential of bus N and changes in current through resistor R. With respect to potential variations tube 42 acts as an impedance element, while with respect to current variations tube 42 acts as an amplifier.

As indicated hereinbefore, an increase in potential of bus N or current through resistor R will produce an increase in impedance of tube 40. This increased impedance will tend to balance bridge 36, thus allowing less current to flow in the control winding of a saturable reactor 81 connected across bridge 36. The control winding of the saturable reactor is connected in series with a rectifier 82 which serves to prevent reverse action of the circuit.

A transformer 83, having a tapped secondary winding 84, feeds current from the A. C. source to a load circuit comprising the A. C. winding of saturable reactor 81 and a resistor 85. The grids of thyratrons 30 and 31 receive an A. C. potential from transformer 34, the primary winding of which is connected between the tap on the secondary winding 84 and the junction of resistor 85 and the A. C. winding of saturable reactor 81.

The smaller current flowing through the control winding of saturable reactor 81 decreases the saturation thereof increasing the reactance of the A. C. winding, thereby increasing the reactive component of the voltage drop thereacross. This in turn causes an increase in the phase angle between the thyratron plate and grid voltage, decreasing the thyratron conduction interval and consequently the direct potential delivered to bus N. Thus, the tendency for the cable current to increase is compensated by an increase in impedance of the ground return path through bridge 36 and a decrease in voltage of bus N. When the cable current tends to decrease, the reverse action occurs, i. e., the phase angle between the anode and grid voltages of thyratrons 30 and 31 decreases, thereby allowing the thyratrons to increase the direct potential delivered to the cable.

As indicated hereinbefore, changes in earth potential require changes in potential of bus N to maintain constant cable current. Because tube 42 appears in the voltage stabilizing circuit as an impedance element, variations in potential of bus N will be repeated thereacross in a sense to maintain the potential of bus N constant. However, when changes in current through resistor R require changes in potential of bus N to maintain the current through resistor R constant, the impedance presented by tube 42 will be varied by the current stabilizing circuit, thereby permitting the required change in potential of bus N. In this manner undesired changes in potential of bus N, which might be caused, for instance, by variations in the A. C. supply, will be compensated while necessary changes in potential of bus N, which might be required, for instance, because of variations in earth potential, will be effected.

Signal currents present in the cable circuit will not affect the operation of the control system because of the shunting action of capacitor 80.

In Fig. 4, which illustrates a modification of the current stabilization circuit of Figs. 2 and 3, circuit elements corresponding to elements in Figs. 2 and 3 are given like reference characters.

The ends of resistor R are connected, respectively, to contacts 90 and 91. Armatures 92 and 93 of an oscillating relay 94 are caused to make alternately with contacts 90 and 91, respectively, and with contacts 95 and 96, respectively. Relay 94 is connected to the A. C. source, so that armatures 92 and 93 vibrate at the frequency of the A. C. source. Armatures 92 and 93 are connected to respective terminals of a capacitor 97, while contacts 95 and 96 are connected to respective terminals of a capacitor 98. Capacitor 98 is shunted by a high leakage resistance 99.

When armatures 92 and 93 are made with contacts 90 and 91, respectively, capacitor 97 tends to charge to a potential equal to the voltage drop across resistor R. When armatures 92 and 93 are made with contacts 95 and 96, capacitor 98 tends to charge to the potential of capacitor 97. Capacitor 98 will, therefore, assume a charge proportional to the current flowing through resistor R. Because of the high resistance discharge path of capacitor 98, the potential thereof will change appreciably only with changes in current through resistor R.

One terminal of capacitor 98 is coupled to ground, while the other terminal thereof is coupled to the control grid of an electron discharge tube 100 through a resistor 101. The control grid of tube 100 is coupled to ground through a high resistance 102. The cathode of tube 100 is coupled to ground through a biasing resistor 103 suitably by-passed by a capacitor 104. The anode of tube 100 is coupled to a source of positive potential through a resistor 105 and to ground through a voltage divider network comprising resistors 106 and 107. The junction of resistors 106 and 107 is coupled to the control grid of tube 42.

Any change in current through resistor R will cause a change in potential across capacitor 98. Changes in potential across capacitor 98 are repeated at the control grid of tube 100. For instance, if the current through resistor R were to increase, the potential across capacitor 98 would increase, decreasing the negative bias on the control grid of tube 100. As a result, the anode potential of tube 100 will drop, which drop will be repeated at the control grid of tube 42, thereby tending to lower the current through resistor R in a manner described hereinbefore.

It is evident that the control circuit described in connection with Fig. 4 is not directly connected to the cable circuit and hence is not subjected to the high negative potentials applied to the cable.

While the invention has been described in particular embodiments thereof and in a particular use, it is not desired that it be limited thereto, for obvious modifications thereof will occur to those skilled in the art without departing from the spirit and scope of the invention as set forth in the appended claims.

What is claimed is:

1. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable circuit, a first impedance network arranged in the form of a normally unbalanced bridge circuit for applying said direct voltage in positive polarity to said ground return, said bridge circuit having in one branch thereof the discharge path of a first electron discharge tube, means to apply a triggering signal to the grids of said thyratron tubes, means responsive to the degree of balance of said bridge circuit to vary the phase of said triggering signal thereby to vary the value of said direct voltage, a second impedance network comprising the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance thereof and the degree of balance of said bridge circuit proportional to variations in said direct voltage thereby to stabilize said direct voltage at a first value thereof, a resistive element interposed in said submarine cable circuit, means to derive from said resistive element a second control potential, means to amplify said second control potential and to apply said second control potential to the control grid of said second electron discharge tube to vary the impedance thereof proportional to variations in direct current flow through said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

2. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable circuit, a first impedance network arranged in the form of a normally unbalanced bridge circuit for applying said direct voltage in positive polarity to said ground return, said bridge circuit having in one branch thereof the discharge path of a first electron discharge tube, means to derive a triggering signal from said source of alternating current power and to apply said triggering signal to the grids of said thyratron tubes, means comprising a saturable reactor having a direct current winding coupled to said bridge circuit and an alternating current winding coupled to the grids of said thyratron tubes and being responsive to the degree of balance of said bridge circuit to vary the phase of said triggering signal thereby to vary the value of said direct voltage, a second impedance network comprising the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance thereof and the degree of balance of said bridge circuit proportional to variations in said direct voltage thereby to stabilize said direct voltage at a first value thereof, a resistive element interposed in said submarine cable circuit, means to derive from said resistive element a second control potential, means to amplify said second control potential and to apply said second control potential to the control grid of said second electron discharge tube to vary the impedance value thereof proportional to variations in direct current flow through said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

3. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable circuit, a first impedance network arranged in the form of a normally unbalanced bridge circuit for applying said direct voltage in positive polarity to said ground return, said bridge circuit having in one branch thereof the discharge path of a first electron discharge tube, means to apply a triggering signal to the grids of said thyratron tubes, means responsive to the degree of balance of said bridge circuit to vary the phase of said triggering signal thereby to vary the value of said direct voltage, a second impedance network comprising the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance thereof and the degree of balance of said bridge circuit proportional to variations in said direct voltage thereby to stabilize said direct voltage at a first value thereof, a resistive element interposed in said submarine cable circuit, means to derive from said resistive element a second control potential, means comprising a two-stage direct coupled cascade amplifier circuit having the control grid and cathode electrodes of the first stage coupled respectively to opposite ends of said resistive element to amplify said second control potential, means comprising a phase inverting stage having the control grid thereof coupled to the anode of the second one of said amplifying stages and the anode thereof coupled to the control grid of said second electron discharge tube to apply said second control potential to the control grid of said second electron discharge tube to vary the impedance thereof proportional to variations in direct current flow through said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

4. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable, a first impedance network arranged in the form of a normally unbalanced bridge circuit for applying said direct voltage in positive polarity to said ground return, said bridge circuit having in one branch thereof the discharge path of a first electron discharge tube, means to apply a triggering signal to the grids of said thyratron tubes, means responsive to the degree of balance of said bridge circuit to vary the phase of said triggering signal thereby to vary the value of said direct voltage, a second impedance network comprising the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance thereof and the degree of balance of said bridge circuit proportional to variations in said direct voltage thereby to stabilize said direct voltage at a first value thereof, a resistive element interposed in said submarine cable circuit, a first capacitive element, a second capacitive element, relay means coupled to a source of alternating current potential alternately to couple said first capacitive element across said resistive element and across said second capacitive element thereby to produce a charge across said second capacitive element proportional to the voltage drop across said resistive element, a third electron discharge tube having the cathode and control grid electrodes thereof coupled respectively to opposite terminals of said second capacitive element, means to derive from the anode of said third electron discharge tube a second control potential having a value proportional to the current flow through said resistive element and to apply said second control potential to the control grid of said second electron discharge tube to vary the impedance thereof proportional to variations in direct current flow through said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

5. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable, a first impedance network arranged in the form of a normally unbalanced bridge circuit for applying said direct voltage in positive polarity to said ground return, said bridge circuit having in one branch thereof the discharge path of a first electron discharge tube, means to apply a triggering signal to the grids of said thyratron tubes, means responsive to the degree of balance of said bridge circuit to vary the phase of said triggering signal thereby to vary the value of said direct voltage, a second impedance network comprising the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance thereof and the degree of balance of said bridge circuit proportional to variations in said direct voltage thereby to stabilize said direct voltage at a first value thereof, a resistive element interposed in said submarine cable circuit, means to derive from said resistive element a second control potential having a value substantially solely proportional to the voltage drop across said resistive element, a third electron discharge tube, means to apply said second control voltage to the control grid of said third electron discharge tube, means intercoupling the anode of said third electron discharge and the control grid of said second electron discharge tube to apply said second control potential to the control grid of said second electron discharge tube to vary the impedance thereof proportional to variations in direct current flow through said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

6. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable, a first impedance network arranged in the form of a normally unbalanced bridge circuit for applying said direct voltage in positive polarity to said ground return, said bridge circuit having in one branch thereof the discharge path of a first electron discharge tube, means to apply a triggering signal to the grids of said thyratron tubes, means responsive to the degree of balance of said bridge circuit to vary the phase of said triggering signal thereby to vary the value of said direct voltage, a second impedance network comprising the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance thereof and the degree of balance of said bridge circuit proportional to variations in said direct voltage thereby to stabilize said direct voltage at a first value thereof, a resistive element interposed in said submarine cable circuit, means to derive from said resistive element a second control potential having a value substantially solely proportional to the voltage drop across said resistive element, means to apply said second control potential to the control grid of said second electron discharge tube to vary the impedance thereof proportional to variations in direct current flow through said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

7. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable, a first impedance network arranged in the form of a normally unbalanced bridge circuit for applying said direct voltage in positive polarity to said ground return, said bridge circuit having in one branch thereof the discharge path of a first electron discharge tube, means to apply a triggering signal to the grids of said thyratron tubes, means responsive to the degree of balance of said bridge circuit to vary the phase of said triggering signal thereby to vary the value of said direct voltage, a second impedance network comprising the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance value thereof and the degree of balance of said bridge circuit proportional to variations in said direct voltage thereby to stabilize said direct voltage at a first value thereof, a resistive element interposed in said submarine cable circuit, means to derive from said resistive element a second control potential, means to amplify said second control potential and to apply said second control potential to the control grid of said second electron discharge tube to vary the impedance thereof proportional to variations in current flow through said resistive element, means to suppress variations in impedance of said second electron discharge tube produced by signalling currents in said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

8. A direct current power supply for supplying a substantially constant predetermined current to a submerged repeater interposed in a submarine cable circuit having a ground return and being subjected to varying earth potentials, comprising a source of alternating current power, a full-wave grid-controlled thyratron rectifier circuit coupled to said source of alternating current power and having a plurality of thyratron tubes arranged to deliver a direct voltage, circuit means for applying said direct voltage in negative polarity to said submarine cable, a first impedance network arranged in the form of a normally unbalanced bridge circuit for applying said direct voltage in positive polarity to said ground return, said bridge circuit having in one branch thereof the discharge path of a first electron discharge tube, means to apply a triggering signal to the grids of said thyratron tubes, means responsive to the degree of balance of said bridge circuit to vary the phase of said triggering signal thereby to vary the value of said direct voltage, a second impedance network comprising a voltage regulator tube and the discharge path of a second electron discharge tube and being coupled between said circuit means and said ground return, means to derive from said second impedance network a first control potential proportional to the value of said direct voltage, means to apply said first control potential to the control grid of said first electron discharge tube in a sense to vary the impedance value thereof and the degree of balance of said bridge circuit proportional to variations in said direct voltage thereby to stabilize said direct voltage at a first value thereof, a resistive element interposed in said submarine cable circuit, means to derive from said resistive element a second control potential, means to amplify said second control potential and to apply said second control potential to the control grid of said second electron discharge tube to vary the impedance thereof proportional to variations in direct current flow through said resistive element, said variations in impedance of said second electron discharge tube producing variations in magnitude of said first control potential proportional to said variations in direct current through said resistive element thereby to stabilize said direct voltage at a second value thereof at which the direct current flow through said submarine cable circuit is substantially equal to said predetermined value thereof.

9. A direct current power source for providing a substantially constant predetermined current to a load circuit of varying back potential comprising a direct current power supply of relatively low internal impedance including exciting means for regulating its output, a source of primary control potential comprising a bridge network traversed by output current from the said power supply and having a variable resistance element in one arm thereof, a source of secondary control potential comprising a shunt impedance network disposed across the output of said power supply and said bridge network and having a variable resistance element in one arm thereof, a source of tertiary control potential comprising a series resistor in the output of said direct current power supply, means for applying said primary control potential to said exciting means to regulate the output of said power supply, means for applying said secondary control potential to said variable resistance element to change the resistance thereof, and means for applying said tertiary control potential to said shunt impedance network to modify the output of said source of secondary potential, whereby the output voltage of the said power supply applied across the said shunt impedance network together with said tertiary control potential applied thereto produces said secondary control potential therein, thereby to establish a value of said variable resistance element to determine the resistance thereof to the flow of output current from said power supply, and concurrently to develop a primary control potential of a size and sign to produce a regulated output voltage from said power supply which will maintain a substantially constant direct current flow in the said load circuit.

10. A direct current power source for providing a substantially constant predetermined current to a load including a submarine cable circuit having an electronic repeating amplifier interposed in a submerged portion thereof, said submarine cable circuit being subjected to varying earth potentials, comprising a direct current power supply of relatively low internal impedance including exciting means for regulating its output, a source of primary control potential comprising a bridge network traversed by output current from the said power supply and having a variable resistance element in one arm thereof, a source of secondary control potential comprising a shunt impedance network disposed across the output of said power supply and said bridge network and having a variable resistance element in one arm thereof, a source of tertiary control potential comprising a series resistor in the output of said direct current power supply, means for applying said primary control potential to said exciting means to regulate the output of said power supply, means for applying said secondary control potential to said variable resistance element to change the resistance thereof, and means for applying said tertiary control potential to said shunt impedance network to modify the output of said source of secondary potential, whereby the output voltage of the said power supply applied across the said shunt impedance network together with said tertiary control potential applied thereto produces said secondary control potential therein, thereby to establish a value of said variable resistance element to determine the resistance thereof to the flow of output current from said power supply, and concurrently to develop a primary control potential of a size and sign to produce a regulated output voltage from said power supply which will maintain a substantially constant direct current flow in the said cable circuit.

11. A direct current power source for providing a substantially constant predetermined current to a load including a submarine cable circuit having an electronic repeating amplifier interposed in a submerged portion thereof, said submarine cable circuit being subjected to varying earth potentials, comprising a source of alternating voltage, a direct current power supply of relatively low internal impedance including means to rectify said alternating voltage, a source of primary control potential comprising a bridge network traversed by output current from the said power supply and having a variable resistance element in one arm thereof, a source of secondary control potential comprising a shunt impedance network disposed across the output of said power supply and said bridge network and having a variable resistance element in one arm thereof, a source of tertiary control potential comprising a series resistor in the output of said direct current power supply, means for applying said primary control potential to said exciting means to regulate the output of said power supply, means for applying said secondary control potential to said variable resistance element to change the resistance thereof, and means for applying said tertiary control potential to said shunt impedance network to modify the output of said source of secondary potential, whereby the output voltage of the said power supply applied across the said shunt impedance network together with said tertiary control potential applied thereto produces said secondary control potential therein, thereby to establish a value of said variable resistance element to determine the resistance thereof to the flow of output current from said power supply, and concurrently to develop a primary control potential of a size and sign to produce a regulated output voltage from said power supply which will maintain a substantially constant direct current flow in the said cable circuit.

12. A direct current power source for providing a substantially constant predetermined current to a load including a submarine cable circuit arranged for transmission of telegraph signals and having an electronic repeating amplifier interposed in a submerged portion thereof, said submarine cable circuit being subjected to varying earth potentials, comprising a direct current power supply of relatively low internal impedance including exciting means for regulating its output, a source of primary control potential comprising a bridge network traversed by output current from the said power supply and having a variable resistance element in one arm thereof, a source of secondary control potential comprising a shunt impedance network disposed across the output of said power supply and said bridge network and having a variable resistance element in one arm thereof, a source of tertiary control potential comprising a series resistor in the output of said direct current power supply, means for applying said primary control potential to said exciting means to regulate the output of said power supply, means for applying said secondary control potential to said variable resistance element to change the resistance thereof, and means for applying said tertiary control potential to said shunt impedance network to modify the output of said source of secondary potential, whereby the output voltage of the said power supply applied across the said shunt impedance network together with said tertiary control potential applied thereto produces said secondary control potential therein, thereby to establish a value of said variable resistance element to determine the resistance thereof to the flow of output current from said power supply, and concurrently to develop a primary control potential of a size and sign to produce a regulated output voltage from said power supply which will maintain a substantially constant direct current flow in the said cable circuit.

13. A direct current power source for providing a substantially constant predetermined current to a load circuit coupled between a first potential bus and ground and having a varying back potential, comprising a transformer source of power, a second potential bus, a controlled direct current power supply of relatively low internal impedance comprising a rectifier circuit coupled to the said transformer and to the said busses to produce a direct output voltage across said potential busses, a source of primary control potential comprising a bridge network traversed by output current from the said power supply and having in one arm thereof the discharge path of at least one electron discharge tube, a source of secondary control potential comprising a shunt impedance network disposed across the output of said power supply and said bridge network and having an electron discharge tube in one arm thereof, a source of tertiary control potential comprising a series resistor in the output of said direct current power supply, means for applying said primary control potential to said rectifier circuit to regulate the output of said power supply, means for applying said secondary control potential to said discharge tube in said bridge network to change the resistance thereof, and means for applying said tertiary control potential to said discharge tube in said shunt impedance network to modify the output of said source of secondary potential, whereby the output voltage of the said power supply applied across the said shunt impedance network together with said tertiary control potential applied thereto produces said secondary control potential therein, thereby to establish a resistance value of said discharge path in said bridge network to determine the resistance thereof to the flow of output current from said power supply, and concurrently to develop a primary control potential of a size and sign to produce a regulated output voltage from said power supply which will maintain a substantially constant direct current flow in the said load circuit.

14. A direct current power source for providing a substantially constant predetermined current to a load circuit coupled between a first potential bus and ground and having a varying back potential comprising a transformer source of power, a second potential bus, a controlled direct current power supply of relatively low internal impedance comprising a thyratron rectifier circuit coupled to the said transformer and to the said busses to produce a direct output voltage across said potential busses, a source of primary control potential comprising a bridge network traversed by output current from the said power supply and having in one arm thereof the discharge path of at least one electron discharge tube, a source of secondary control potential comprising a shunt impedance network disposed across the output of said power supply and said bridge network and having an electron discharge tube in one arm thereof, a source of tertiary control potential comprising a series resistor in the output of said direct current power supply, means for applying said primary control potential to the grid of said thyratron rectifier circuit to regulate the output of said power supply, means for applying said secondary control potential to said discharge tube in said bridge network to change the resistance thereof, and means for applying said tertiary control potential to said discharge tube in said shunt impedance network to modify the output of said source of secondary potential, whereby the output voltage of the said power supply applied across the said shunt impedance network together with said tertiary control potential applied thereto produces said secondary control potential therein, thereby to establish a resistance value of said discharge path in said bridge network to determine the resistance thereof to the flow of output current from said power supply, and concurrently to develop a primary control potential of a size and sign to produce a regulated output voltage from said power supply which will maintain a substantially constant direct current flow in the said load circuit.

15. A direct current power source for providing a substantially constant predetermined current to a load circuit coupled between a first potential bus and ground having a varying back potential comprising a transformer source of power, a second potential bus, a controlled direct current power supply of relatively low internal impedance comprising a thyratron rectifier circuit coupled to the said transformer and to the said busses to produce a direct output voltage across said potential busses, a source of primary control potential comprising a bridge network traversed by output current from the said power supply and having in one arm thereof the discharge path of at least one electron discharge tube, a source of secondary control potential comprising a shunt impedance network disposed across the output of said power supply and said bridge network and having an electron discharge tube in one arm thereof, a source of tertiary control potential comprising a series resistor in the output of said direct current power supply, means for applying a triggering signal as said primary control potential to the grid of said thyratron rectifier circuit means to vary the phase of said triggering signal in accordance with variations in voltage drop through and unbalance of the said bridge network to regulate the output of said power supply, means for applying said secondary control potential to said discharge tube in said bridge network to change the resistance thereof, and means for applying said tertiary control potential to said discharge tube in said shunt impedance network to modify the output of said source of secondary potential, whereby the output voltage of the said power supply applied across the said shunt impedance network together with said tertiary control potential applied thereto produces said secondary control potential therein, thereby to establish a resistance value of said discharge path in said bridge network to determine the resistance thereof to the flow of output current from said power supply, and concurrently to develop a primary control potential of a size and sign to produce a regulated output voltage from said power supply which will maintain a substantially constant direct current flow in the said load circuit.

16. A direct current power source for providing a substantially constant predetermined current to a load circuit coupled between a first potential bus and ground having a varying back potential comprising a transformer source of power, a second potential bus, a controlled direct current power supply of relatively low internal impedance comprising a thyratron rectifier circuit coupled to the said transformer and to the said busses to produce a direct output voltage across said potential busses, a source of primary control potential comprising a series connected bridge network traversed by output current from the said power supply and having in one arm thereof the discharge path of at least one electron discharge tube, a source of secondary control potential comprising a shunt impedance network disposed across the output of said power supply and said bridge network and having an electron discharge tube in one arm thereof, a source of tertiary control potential comprising a series resistor in the output of said direct current power supply, means for deriving a triggering signal from the said transformer and for applying said triggering signal as said primary control potential to the grid of said thyratron rectifier circuit, a saturable reactor coupled to said rectifier circuit and to said bridge network to vary the phase of said triggering signal in accordance with variations in voltage drop through and unbalance of said bridge network to regulate the output of said power supply, means for applying said secondary control potential to the control grid of said discharge tube in said bridge network to change the resistance thereof, and means for amplifying and applying a portion of said tertiary control potential to the control grid of said discharge tube in said shunt impedance network to modify the output of said source of secondary potential, whereby the output voltage of the said power supply applied across the said shunt impedance network together with said tertiary control potential applied thereto produces said secondary control potential therein, thereby to establish a resistance value of said discharge path in said bridge network to determine the resistance thereof to the flow of output current from said power supply, and concurrently to develop a primary control potential of a size and sign to produce a regulated output voltage from said power supply which will maintain a substantially constant direct current flow in the said load circuit.

PHILIP H. WELLS.
ALFRED A. STEINMETZ.
WILLIAM D. CANNON.

References Cited in the file of this patent
UNITED STATES PATENTS

| Number | Name | Date |
| --- | --- | --- |
| 2,020,316 | Jacobs | Nov. 12, 1935 |
| 2,037,183 | Strieby | Apr. 14, 1936 |
| 2,329,010 | Spencer | Sept. 7, 1943 |
| 2,373,208 | Trucksess | Apr. 10, 1945 |